United States Patent
Raillard et al.

(10) Patent No.: US 12,271,154 B2
(45) Date of Patent: Apr. 8, 2025

(54) METHOD FOR PRODUCING A FUNCTIONAL ELEMENT ON A TIMEPIECE COMPONENT

(71) Applicant: ETA SA Manufacture Horlogere Suisse, Grenchen (CH)

(72) Inventors: Brice Raillard, Bienne (CH); Vlada Mihailovic, Burgaeschi (CH); Johannes Brunner, Arch (CH); Christophe Emmenegger, Ecuvillens (CH); Frederic Jeanrenaud, La Chaux-de-Fonds (CH)

(73) Assignee: ETA SA Manufacture Horlogere Suisse, Grenchen (CH)

(*) Notice: Subject to any disclaimer, the term of this patent is extended or adjusted under 35 U.S.C. 154(b) by 1257 days.

(21) Appl. No.: 16/210,101

(22) Filed: Dec. 5, 2018

(65) Prior Publication Data
US 2019/0187620 A1 Jun. 20, 2019

(30) Foreign Application Priority Data
Dec. 20, 2017 (EP) .................................... 17209104

(51) Int. Cl.
*G04B 19/32* (2006.01)
*B41J 3/407* (2006.01)
(Continued)

(52) U.S. Cl.
CPC .............. *G04B 19/32* (2013.01); *B41J 3/407* (2013.01); *G04B 19/12* (2013.01); *G04B 19/305* (2013.01);
(Continued)

(58) Field of Classification Search
CPC ...... G04B 19/12; G04B 19/32; G04B 19/305; G04D 3/0043–0051; G04D 3/0092; G02B 6/0003
See application file for complete search history.

(56) References Cited

U.S. PATENT DOCUMENTS 5,380,206 A * 1/1995 Asprey .............. G04B 45/0061
434/257
5,457,664 A * 10/1995 Izukawa ................ G04G 19/12
368/203
(Continued)

FOREIGN PATENT DOCUMENTS

CH 710 489 A2 6/2016
CN 1170670 A 1/1998
(Continued)

OTHER PUBLICATIONS

European Search Report Issued Jun. 25, 2018 in European Application 17209104.3 filed on Dec. 20, 2017 (with English Translation of Categories of Cited Documents & Written Opinion).
(Continued)

*Primary Examiner* — Edwin A. Leon
(74) *Attorney, Agent, or Firm* — Oblon, McClelland, Maier & Neustadt, L.L.P.

(57) ABSTRACT

A method for producing a functional element on a timepiece component, including generating, with a control unit, at least one control command for a printing device intended to reproduce a reference digital graphical representation relating to the functional element; and constructing, with the printing device, at least one layer of at least one functional particle printed on the timepiece component so as to form the functional element.

20 Claims, 2 Drawing Sheets

(51) Int. Cl.
*F21V 8/00* (2006.01)
*F21V 14/08* (2006.01)
*G04B 19/12* (2006.01)
*G04B 19/30* (2006.01)
*G04D 3/00* (2006.01)

(52) U.S. Cl.
CPC ......... *G04D 3/0048* (2013.01); *G04D 3/0092* (2013.01); *F21V 14/08* (2013.01); *G02B 6/0003* (2013.01)

(56) References Cited

U.S. PATENT DOCUMENTS

| | | | | |
|---|---|---|---|---|
| 5,818,717 | A * | 10/1998 | Nunes | G04B 19/10 430/126.1 |
| 5,838,644 | A * | 11/1998 | Yoneda | G04B 19/32 368/239 |
| 5,893,322 | A * | 4/1999 | Schneider | G04B 19/12 101/34 |
| 6,169,932 | B1 * | 1/2001 | Nunes | G04B 19/10 700/127 |
| 6,473,666 | B1 * | 10/2002 | Samura | G04D 3/0092 700/233 |
| 8,204,835 | B1 * | 6/2012 | Ogg | G07B 17/00508 705/401 |
| 2002/0004122 | A1 * | 1/2002 | Planche | G04B 19/10 428/690 |
| 2003/0210291 | A1 * | 11/2003 | Kasahara | G04B 19/12 347/9 |
| 2004/0054031 | A1 * | 3/2004 | Jacobson | G04B 47/00 523/160 |
| 2014/0160904 | A1 * | 6/2014 | Decoux | G04G 9/0041 368/226 |
| 2015/0103634 | A1 * | 4/2015 | In | G04D 7/00 368/10 |
| 2015/0241848 | A1 | 8/2015 | Willemin et al. | |
| 2020/0338809 | A1 * | 10/2020 | Raillard | G04B 19/10 |
| 2021/0370605 | A1 * | 12/2021 | Raillard | G04B 19/12 |

FOREIGN PATENT DOCUMENTS

| | | |
|---|---|---|
| CN | 1207182 A | 2/1999 |
| CN | 201107569 Y | 8/2008 |
| CN | 103904228 A | 7/2014 |
| DE | 10 2016 101 970 A1 | 8/2017 |
| EP | 2 717 104 A1 | 4/2014 |
| FR | 2 900 594 A1 | 11/2007 |
| JP | 07-055593 A | 3/1995 |
| JP | 10-332841 A | 12/1998 |
| JP | 2009-180572 A | 8/2009 |
| JP | 2014-98641 A | 5/2014 |

OTHER PUBLICATIONS

Combined Chinese Office Action and Search Report issued Jul. 24, 2020 in Chinese Application 201811558678.6 (with English Translation), 13 pages.

Japanese Office Action issued Oct. 13, 2020 in Japanese Patent Application No. 2018-226285 (with English translation), 4 pages.

* cited by examiner

METHOD FOR PRODUCING A FUNCTIONAL ELEMENT ON A TIMEPIECE COMPONENT

CROSS-REFERENCE TO RELATED APPLICATION

This application claims priority to European Patent Application No. 17209104.3 filed on Dec. 20, 2017, the entire disclosure of which is hereby incorporated herein by reference.

TECHNICAL FIELD

The present invention relates to a method for producing a functional element on a timepiece component and to a system that implements a method of this kind.

The invention also relates to a timepiece component comprising a functional element of this kind and to a timepiece provided with said component.

The present invention also relates to a computer program.

PRIOR ART

In the prior art, timepiece components such as dials or hands of a watch can comprise functional elements such as phosphorescent elements which help the wearer of the watch to be able to see said hands or the indices of said dials in the dark. Phosphorescent elements of this kind comprise a layer of phosphorescent material provided for absorbing the light energy which will then be restored at night in the form of light radiation. Said phosphorescent elements are typically mounted in said timepiece components by hand according to methods which implement screen printing or pad printing techniques.

However, methods of this kind are relatively complex to carry out owing to the large number of steps required for the implementation thereof and the various types of tools that they require. In addition, the techniques that said methods implement are difficult to realise in the context of automated processes for mounting said functional elements on said timepiece components.

SUMMARY OF THE INVENTION

An aim of the present invention is consequently that of proposing a method that allows a functional element to be produced on a timepiece component in a rapid and simple manner and that also helps improve, in an automated and economical manner, large-scale production of timepiece components provided with functional elements of this kind.

For this purpose, the invention relates to a method for producing a functional element on a timepiece component, comprising the following steps:
  generating, by means of a control unit, at least one control command for a printing device intended to reproduce a reference digital graphical representation relating to said functional element, and
  constructing, by means of the printing device, at least one layer of at least one functional particle printed on the timepiece component so as to form the functional element.

Therefore, owing to these features, the production method allows a functional element to be built on a timepiece component in a reduced number of steps that are implemented simply and rapidly.

In other embodiments:
  the construction step comprises, for the layer of at least one printed functional particle, a sub-step of applying a layer of at least one functional particle onto the timepiece component and a sub-step of treating said layer of at least one functional particle;
  the application sub-step includes execution, by the control unit, of said at least one control command comprising data describing said reference digital graphical representation to be reproduced;
  the application sub-step includes depositing at least one ink comprising said at least one functional particle;
  said ink comprises a fluid that conveys said at least one functional particle, the fluid being selected from a solvent, a viscoelastic polymer, an oil, water and/or an aqueous solution;
  the sub-step of treating the layer of at least one functional particle comprises a phase of attaching said layer of at least one functional particle to the timepiece component;
  the attachment phase includes exposing said layer of at least one functional particle to an in particular hot/dry airflow and/or to light radiation, in particular ultraviolet or infrared radiation;
  when another particle forms said at least one layer built in the construction step, this other particle is coloured, pigmented, colourless, transparent or translucent; and
  said at least one functional particle is comprised in a functional ink selected from the group consisting of an electroluminescent ink, a phosphorescent ink, photoluminescent ink, a conductive ink, a semi-conductive ink, an electroactive ink, a magnetic ink, a photochromic ink, electrochromic ink, thermochromic ink, an ionochromic ink and a mechanochromic ink.

The invention also relates to a timepiece component comprising at least one functional element that can be obtained from a method of this kind.

Advantageously, the functional element is a constituent part of the timepiece component that can change its state in a reversible manner, this change in state allowing a display function of the timepiece to be realised or allowing a step in an operating process of a movement of the timepiece to be established that is intended to perform a function of said timepiece;

The invention also relates to a timepiece having at least one timepiece component of this kind.

The invention also relates to a system for producing a functional element on a timepiece component, which system implements a method of this kind and comprises a printing device and a control unit, said printing device being connected to said control unit.

Advantageously, the control unit comprises hardware and software resources, said hardware resources comprising memory elements having at least one reference digital graphical representation relating to said functional element to be produced on the timepiece component and descriptive data relating to said at least one reference digital graphical representation.

The invention also relates to a computer program comprising program code instructions for carrying out the steps of this method when said program is run by a control unit.

BRIEF DESCRIPTION OF THE FIGURES

Other features and advantages of the present invention will become apparent upon reading a plurality of embodiments, given solely by way of non-limiting example with reference to the accompanying drawings, in which.

DETAILED DESCRIPTION OF THE INVENTION

Figure 1:
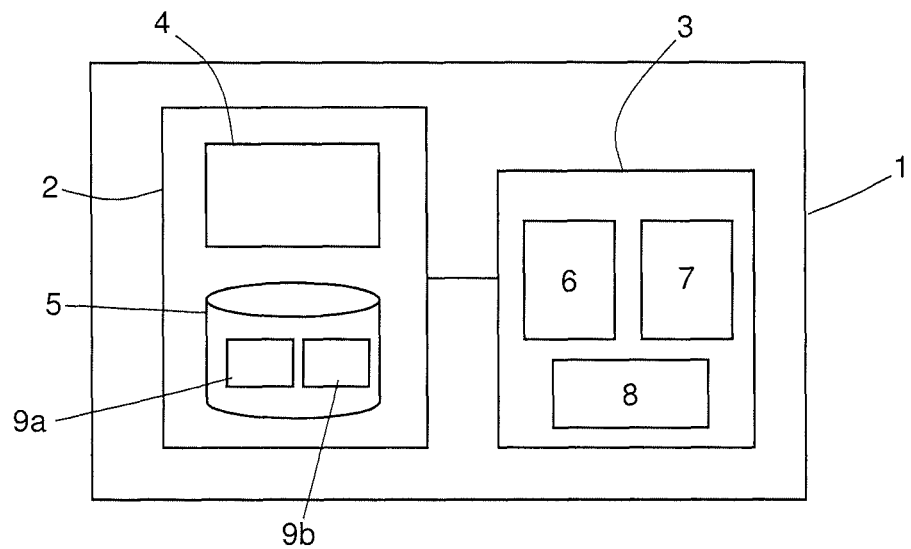
FIG. 1 is a schematic representation relating to a system for producing a functional element on a timepiece component, according to an embodiment of the invention.

With reference to FIG. 1, the system 1 for producing a functional element 20 on a timepiece component 10 of a timepiece 30 comprises a control unit 2 and a printing device 3.

Functional element 20 is understood to mean a constituent element of said timepiece component 10 and thus of the timepiece 30 that can change its state in a reversible manner. This change in state of said functional element 20 allows a display function of the timepiece 30 to be realised and/or allows a step in an operating process of the movement to be established that is intended to perform a function of said timepiece 30. This change in state may be a change in colour or in physical or chemical properties of said functional element 20. A change of this kind is preferably based on a change in the electronic state of the molecules making up said functional element 20, a change which is induced by external stimuli that can modify the electronic density of the substances involved.

In this context, a functional element of this kind may be, in a non-limiting and non-exhaustive manner: an electroluminescent element, a phosphorescent element, a photoluminescent element, a conductive element, a semi-conductive element, an insulating element, an electroactive element, a magnetic element, a photochromic element, an electrochromic element, a thermochromic element, an ionochromic element and a mechanochromic element.

In the timepiece 30, the timepiece component 10 on which the functional element 20 is defined is a piece that preferably has a non-complex shape, i.e. that has a simple shape. In this context, said component 10 may be, in a non-limiting and non-exhaustive manner: a bezel, a hand, a rehaut, a case, a case bottom, an oscillating weight, a disc, a crystal, a watchstrap or a constituent element of the movement. It should be noted that said timepiece component 10 may also be a substrate intended to form a component 10 of this kind. In this configuration, the timepiece component 10 has a construction/building/printing surface of the functional element 20 that is even and preferably planar.

In this system 1, the control unit 2 is connected to the printing device 3 in order in particular to ensure the control of said device 3. The control unit 2 may be a computer or a microcontroller in that it comprises hardware and software resources, in particular at least one processor 4 interacting with the memory elements 5. Said control unit 2 is capable of executing instructions for the implementation of a computer program.

In said control unit 2, the memory elements 5 comprise, in addition to the computer program, data relating to at least one reference digital graphical representation 9a that can be reproduced by the functional element 20 and that will be built on the timepiece component 10, as well as descriptive data 9b relating to said at least one reference digital graphical representation 9a. A reference digital graphical representation 9a comprises, for example, a three-dimensional (3D) reference graphical representation or a two-dimensional (2D) reference graphical representation. It should be noted that the reference digital graphical representation 9a is generated by a design module of the system 1 which is connected to the control unit 2 and can comprise a three-dimensional and/or two-dimensional digitising device, or by a software tool run by the control unit 2 for 2D/3D virtual modelling on the basis of photographs or images or for designing a three-dimensional virtual digital object (for example computer-aided design software, known better under the acronym CAD).

Figure 4:
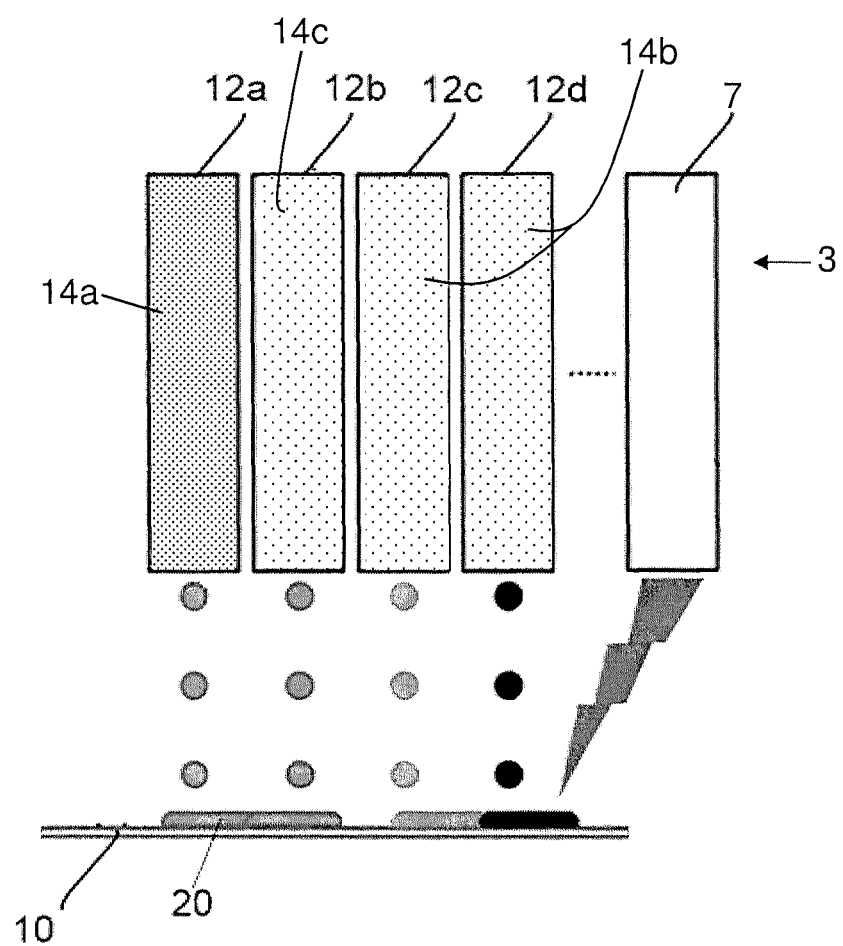
FIG. 4 is a schematic view of a printing device of the system, according to the embodiment of the invention.

In FIGS. 1 and 4, a printing device 3 of this kind comprises a print member 6, an attachment member 7 and a drive member 8. The print member 6 comprises a plurality of print entities, specifically ink jet print cartridges, each cartridge comprising a print head and at least one reservoir 12a to 12d. In the present embodiment, each cartridge comprises at least one print head and at least one ink jet reservoir 12a to 12d. In said cartridges, the ink has at least one particle that can be comprised in a fluid. A fluid of this kind is provided for ensuring that said at least one particle is conveyed onto the carrier on which it is intended to be deposited, in this case the timepiece component 10, when it is ejected from the entity. A fluid of this kind may be any body that can ensure said conveyance and/or that also can help connect at least one particle with a carrier comprising the timepiece component 10 or a layer of at least one particle already present on said component 10. Said fluid may be selected in a non-limiting and non-exhaustive manner from a solvent, a viscoelastic polymer, an oil, water and an aqueous solution. By way of example, if it is a viscoelastic polymer, said fluid is an unpolymerised liquid-phase viscoelastic polymer fluid which is preferably photopolymerisable. It should be noted that, in a variant, said at least one particle can be deposited on said carrier without requiring a fluid of this kind to ensure the conveyance thereof. In said print member 6, at least one cartridge necessarily comprises a functional ink 14a having at least one functional particle. An ink of this kind may be, for example, an electroluminescent ink, a phosphorescent ink, photoluminescent ink, a conductive ink, a semi-conductive ink, an electroactive ink, a magnetic ink, a photochromic ink, electrochromic ink, thermochromic ink, an ionochromic ink and a mechanochromic ink.

The other cartridges of said print member 6 may comprise other types of ink, for example:
- a coloured ink 14b having at least one pigmented or coloured particle; or
- a colourless or transparent or translucent ink 14c, such as a lacquer, having at least one colourless or transparent or translucent particle.

A layer composed of at least one functional particle and at least one coloured or pigmented particle, and/or composed of at least one colourless or transparent or translucent particle, may have, in a non-exhaustive and non-limiting manner:
- a white colour only;
- a white colour having a matt or gloss finish due to the presence of at least one colourless or transparent or translucent particle;
- a black colour only;

a black colour having a matt or gloss finish due to the presence of at least one colourless or transparent or translucent particle;

a colourless lacquer;

a colourless lacquer having a matt or gloss finish due to the presence of at least one colourless or transparent or translucent particle;

a wide variety of colours owing to the four-colour printing technique which implements primary colours such as cyan, magenta, yellow and black (referred to as the CMYK system), allowing a wide variety of colours to be reproduced from three elementary colours, a blue-green referred to as cyan, a red referred to as magenta and a yellow, to which colours the colour black is added.

In addition, a printing device 3 of this kind is also capable of helping to produce a functional element 20 on the timepiece component 10 at a low resolution or at a high resolution that may be greater than or equal to 2400 dpi (pixels per inch).

In this printing device 3, the drive member 8 is capable of causing the print member 6 to move in various directions relative to a carrier element of the system 1 on which the timepiece component 10 can be arranged. Said carrier element, which is capable of moving the timepiece component 10 ahead of the print heads 12a to 12d, may comprise a removable connecting element for the timepiece component 10, for example an adhesive element. The attachment member 7 is provided for ensuring the attachment of a layer of at least one particle to the carrier, in this case the timepiece component or a first layer or an initial layer already present on said timepiece component 10. Said attachment member 7 comprises a module that can emit ultraviolet (UV) radiation and/or infrared radiation and/or an airflow, in particular a hot airflow. Said module is capable of generating radiation or an airflow over all or part of a mounting region of a surface of the timepiece component 10 on which the functional element 20 can be built. It should be noted that when different inks, as mentioned above, comprise a viscoelastic polymer fluid, the module is a photopolymerisation module provided with an ultraviolet (UV) radiation source and which is therefore capable of generating UV radiation over all or part of the mounting region of the surface of the timepiece component 10 on which the functional element 20 can be built.

Figure 2:
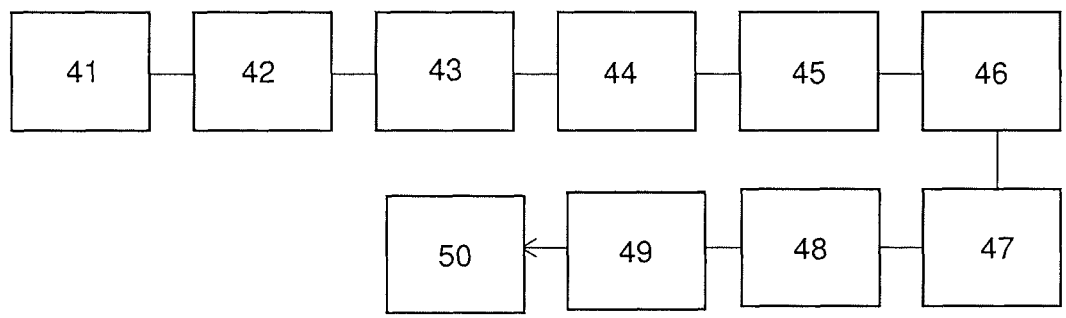
FIG. 2 is a flow chart relating to a method for producing a functional element on a timepiece component, according to the embodiment of the invention.
Figure 3:
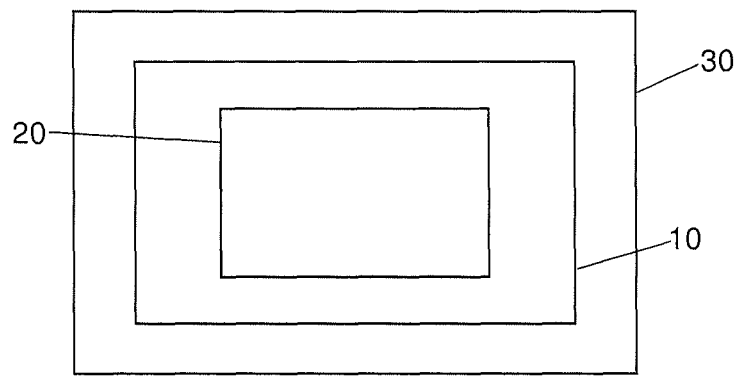
FIG. 3 is a schematic representation of a timepiece comprising a timepiece component provided with at least one functional element, according to the embodiment of the invention.

A system 1 of this kind is capable of implementing a method for producing the functional element 20 on the timepiece component 10 shown in FIG. 2. This method is particularly suitable for producing said functional element 20 directly on the timepiece component 10 without using an intermediate transfer element of the blanket type and this is owing to the specific features of said timepiece component 10. Said specific features relate to the non-complex, i.e. simple, shape of said component 10, and to the fact that said component comprises a construction/building/printing surface of said functional element 20 that is even and preferably planar.

Said method comprises a step 41 of generating at least one reference digital graphical representation 9a. A reference digital graphical representation 9a of this kind corresponds to an in particular structural definition of the functional element 20 that is intended to be constructed on the timepiece component 10. During said step 41, said reference digital graphical representation 9a may be produced from a three-dimensional/two-dimensional digitisation, or when the control unit 2 runs 2D/3D virtual modelling software or software for designing a three-dimensional virtual digital object (for example computer-aided design software, known better under the acronym CAD). Once generated, said reference digital graphical representation 9a is archived in the format of a digital data file in the memory elements 5 of the control unit 2. In other words, a file of this kind comprises information data relating to the reference digital graphical representation 9a.

The method then includes a step 42 of determining descriptive data 9b relating to said reference digital graphical representation 9a. A step 22 of this kind is implemented by the control unit 2 and thus allows descriptive data 9b to be determined, which data helps in particular to select the type or types of ink required to produce the functional element 20 on the timepiece component 10 as well as the direction of movement of the print member 6. During said step 42, said file and in particular information data relating to the reference digital graphical representation 9a is processed. More specifically, during this processing, the control unit 2 determines elements that are characteristic of the reference digital graphical representation 9a such as:

at least one dimension of said reference digital graphical representation 9a; this may be, for example, a thickness, length, width, surface area, volume, etc.;

visual/aesthetic/structural, i.e. visual and/or aesthetic and/or structural, aspects of the reference digital graphical representation 9a such as colour and/or texture, etc.;

physical and/or chemical functional characteristics that the functional element 20 must have, for example:

electrical conductivity, semiconducting or insulating nature;

semiconductivity;

electroluminescence;

photoluminescence (for example a reaction to ultraviolet radiation);

phosphorescence;

"X-chromism" (photochromic, electrochromic, thermochromic, ionochromic, mechanochromic . . . );

electroactivation;

magnetism;

etc.

It should be noted that, in a variant, said processing may include implementing in particular a process of digital division/cutting of said graphical representation 9a into at least two layers in a transverse direction that may be horizontal, vertical or oblique, and/or a longitudinal direction that may be horizontal, vertical or oblique. In this case, the control unit 2 thus determines elements that are characteristic of each of said layers that will be reproduced for building the functional element 20 on the timepiece component 10.

The characteristic elements constitute descriptive data 9b relating to the reference digital graphical representation 9a that are archived in the memory elements 5 of the control unit 2.

The method for producing said functional element 20 also comprises a step 43 of arranging the timepiece component 10 on the carrier element of the system 1. The method also comprises a step 44 of selecting the reference digital graphical representation 9a that is intended to be reproduced on the timepiece component 10 in order to build the functional element 20 thereon. During said selection step 44, it is thus possible to select said reference digital graphical representation 9a using a human-machine interface (HMI) connected to the control unit 2. It should be noted that said selection step 44 may be implemented equally before or after the arrangement step 43.

Said method further comprises a step 45 of treating the surface of the timepiece component 10, in particular in the mounting region of said surface on which the functional element 20 will be produced. Said treatment step 45 may be implemented equally before or after one or the other of the generation step 41, determination step 42, arrangement step 43 or selection step 44. A treatment step 45 of this kind may be carried out by implementing atmospheric plasma, low-pressure plasma, flame, electric corona discharge, organic layer deposition, cleaning bath or galvanic treatment techniques, treatment techniques using adhesion primer or a combination of one or the other or a plurality of said techniques. A step 45 of this kind may or may not be carried out under vacuum. In addition, it should be noted that said treatment step 45 helps ensure good adhesion between the planar surface of the timepiece component 10 and the functional element 20 produced on said timepiece component 10, in particular between a first layer known as the initial layer that makes up said functional element 20 and said surface, in particular when said functional element 20 is constructed from at least two layers of at least one functional particle as will be seen below.

The method then includes a step 46 of generating, by the control unit 2, at least one control command for controlling the printing device 3, said at least one command being intended to reproduce the reference digital graphical representation 9a for building the functional element 20 on the timepiece component 10. Said step 46 of generating said at least one control command is carried out on the basis of descriptive data 9b relating to the reference digital graphical representation 9a. Said at least one command comprises criteria for producing the functional element 20 on the timepiece component 10, in particular criteria for controlling the printing device 3 and in particular the print member 6 and the attachment member 7. Said production criteria comprise, in a non-limiting and non-exhaustive manner, data relating to:
- a selection of cartridges comprising the print heads 12a to 12d required for reproducing the reference digital graphical representation 9a and, depending on the ink that they contain, in particular for reproducing functional features and visual/aesthetic/structural aspects of the reference digital graphical representation 9a;
- movement of the print head 12a to 12d of each cartridge relative to the mounting region of the surface of the timepiece component 10 for reproducing the functional features and visual/aesthetic/structural aspects and/or at least one dimension of the reference digital graphical representation 9a;
- distance and/or positioning of the print head 12a to 12d of each cartridge relative to the mounting region of the surface of the timepiece component 10 for reproducing the functional features and visual/aesthetic/structural aspects and/or at least one dimension of the reference digital graphical representation 9a;
- duration of positioning the print head 12a to 12d of each cartridge relative to the mounting region of the surface of the timepiece component 10 for reproducing the functional features and visual/aesthetic/structural aspects and/or at least one dimension of the reference digital graphical representation 9a;
- ink flow ejected from the print heads 12a to 12d, in particular the number of droplets ejected for reproducing the functional features and visual/aesthetic/structural aspects and/or at least one dimension of the reference digital graphical representation 9a.

The method subsequently comprises a step 47 of constructing, by means of the printing device 3, at least one layer of at least one functional particle printed on the timepiece component 10 so as to form the functional element 20. Said at least one functional particle is comprised in the functional ink mentioned above. It should be noted that a layer may be formed solely from at least one printed functional particle or from said at least one particle and other coloured and/or colourless/transparent/translucent printed particles.

Said construction step 47 comprises, for each layer of at least one printed functional particle built on the timepiece component 10, two sub-steps 48, 49. The first sub-step is a sub-step 48 for applying a layer of at least one functional particle onto said timepiece component 10 in particular on the mounting region of the surface of said component 10. Said application of the layer may be carried out continuously or selectively. As mentioned above, said at least one particle is a functional particle. It is understood that said layer may comprise, in addition to at least one functional particle, a plurality of other types of particles selected from coloured or colourless/translucent/transparent particles. Moreover, said application sub-step 48 includes execution, by the control unit 2, of said at least one control command comprising data describing said reference digital graphical representation 9a to be reproduced. The execution of said at least one command makes it possible to control, as part of applying said layer, the deposition of at least one ink comprising said at least one functional particle and optionally other types of ink comprising at least one coloured or colourless/translucent/transparent particle. The second sub-step is a step 49 of treating said layer of at least one functional particle, which sub-step directly follows the application sub-step 48 and helps to complete the printing of said layer on the timepiece component 10 in order to obtain a layer in which said at least one particle is printed on said component 10. Said sub-step 49 of treating the layer of at least one functional particle comprises a phase of attaching said layer to at least one functional particle on the timepiece component 10. Said attachment phase includes exposing the layer of at least one functional particle to an in particular hot airflow and/or to light radiation, in particular ultraviolet (UV) or infrared radiation. Said attachment phase is thus intended to transform, attach or connect (like a particle in a matrix) the layer of at least one functional particle that is in a pasty or liquid state into a layer of at least one printed functional particle that is in a solid, rigid, resilient, dry, cured and/or infusible state. It should be noted that a transformation of this kind has the advantage of being carried out very rapidly, in general in less than a second.

In an example in which the functional particle is comprised in a viscoelastic polymer ink, i.e. an ink comprising a viscoelastic polymer fluid capable of conveying said at least one functional particle, the construction step 47 includes an application sub-step 48 in which the control unit 2 executes said at least one control command comprising data 9b describing said reference digital graphical representation 9a to be reproduced. The printing device 3 subsequently applies a layer of at least one functional particle directly onto the mounting region of the surface provided for this purpose on the timepiece component 10 according to said at least one executed control command. Said layer comprises a functional ink having said at least one functional particle conveyed by a viscoelastic polymer fluid; in this context, said ink is also referred to as viscoelastic polymer functional ink. Said viscoelastic polymer functional ink layer is otherwise referred to as the initial layer or first layer. Said first layer and thus the particle or particles constituting said layer is then subjected to polymerisation during a sub-step 49 of treating said layer. Said sub-step 49 comprises a phase of attaching said layer to the mounting region. During said phase, said layer is photopolymerised by being exposed to light radiation, in particular ultraviolet (UV) radiation, that is emitted by the attachment member 7 and is intended to transform said layer into an acrylate polymer functional ink layer, again referred to as the viscoelastic polymer functional ink layer or printed viscoelastic polymer functional ink layer. It should be noted that said polymerised/printed viscoelastic polymer ink may also be referred to as photo-cured ink or photopolymerised polymer ink. The printing device 3 may subsequently apply a second layer of at least one functional and/or coloured and/or colourless/translucent/transparent particle onto the first layer of at least one polymerised viscoelastic polymer fluid that is already present on said timepiece component 10, according to said at least one executed control command. Said second layer may comprise a functional ink and/or a coloured ink and/or a colourless/translucent/transparent ink having said at least one corresponding particle conveyed by a viscoelastic polymer fluid; in this context, said inks are also referred to as viscoelastic polymer functional ink, viscoelastic polymer coloured ink and viscoelastic polymer colourless/translucent/transparent ink. Said second layer and thus the particle or particles constituting said layer is then subjected to polymerisation during a treatment sub-step 49. Said first and second layers are arranged on the timepiece component 10 by being substantially superimposed or superimposed. In a variant, the second layer may be applied both onto the first layer and directly onto the mounting region of the surface of the timepiece component 10. In these conditions, said polymerisation makes it possible to attach the first layer to the surface of the timepiece component 10 and the second layer to the first layer or to said first layer as well as to the mounting region of the surface of the timepiece component 10 according to the corresponding variants.

Said method subsequently comprises a step 50 of removing the timepiece component 10 from the carrier element of the system 1 prior to being packaged until such time as a timepiece 30 is designed.

It should be noted that the functional element 20 on said timepiece component 10 may be coloured, multicoloured, monochrome, transparent or translucent and may comprise or be comprised in a decorative element or a pattern that can have a relief, for example.

It is noted that a layer of at least one particle is understood to mean a layer which is deposited on the mounting region of the surface of the timepiece component 10 provided for this purpose in a selective or continuous manner, and which can be subjected to an attachment phase by exposition to light radiation or to an airflow. In the context of the invention, a layer may have a constant thickness at all points or an uneven thickness that is obtained by the deposition of a variable number of droplets of at least one ink by at least one ink jet print head 12a to 12d depending on the position of said head 12a to 12d relative to the timepiece component 10, by at least one single pass of said at least one print head 12a to 12d over the mounting region of the surface of the timepiece component 10 where the functional element 20 is intended to be built. It should be noted that each droplet comprises at least one particle.

The invention also relates to a computer program comprising program code instructions for carrying out steps 41 to 50 of this method when said program is run by the control unit 2.

The invention claimed is:

1. A method for producing a functional element on a timepiece component, comprising the following steps:
    determining descriptive data describing a reference digital graphical representation to build the functional element, the descriptive data includes elements that are characteristic of the reference digital graphical representation, the characteristic elements comprising:
        at least one dimension of the reference digital graphical representation,
        visual, aesthetic, or structural aspects of the reference digital graphical representation, and
        physical or chemical functional characters possessed by the functional element;
    generating based on the descriptive data, with a control unit, at least one control command for a printing device intended to reproduce the reference digital graphical representation relating to said functional element in a mounting region of a surface of the timepiece component, on which the functional element will be produced, said at least one control command comprising data describing said reference digital graphical representation to be reproduced; and
    constructing on the mounting region, with at least one printhead of the printing device, at least one layer of at least one functional particle printed on the timepiece component so as to form the functional element, the timepiece component being an element of a movement of a watch and the functional element is configured to change state in a reversible manner as a step in an operating process of the movement of the watch,
    wherein the functional element is produced directly on the timepiece without the layer of at least one functional particle passing through an intermediate transfer element between the at least one printhead and the timepiece component,
    wherein the construction step comprises, for the layer of at least one printed functional particle, a sub-step of applying a layer of at least one functional particle onto the timepiece component and the sub-step of applying said layer includes execution, by the control unit, of said at least one control command, and
    wherein the method further comprises processing the mounting region of the surface of the timepiece component on which the functional element will be produced, said processing contributes to ensuring adhesion between the surface of the timepiece component and the functional element produced on the timepiece component.

2. The method according to claim 1, wherein the construction step comprises, for the layer of at least one printed functional particle, a sub-step of treating said layer of at least one functional particle.

3. The method according to claim 2, wherein the application sub-step comprises depositing at least one ink comprising said at least one functional particle.

4. The method according to claim 3, wherein said ink comprises a fluid that conveys said at least one functional particle, the fluid being selected from a solvent, a viscoelastic polymer, an oil, water and/or an aqueous solution.

5. The method according to claim 2, wherein the sub-step of treating the layer of at least one functional particle comprises a phase of attaching said layer of at least one functional particle to the timepiece component.

6. The method according to claim 5, wherein the attachment phase comprises exposing the layer of at least one functional particle to an hot/dry airflow and/or to light radiation.

7. The method according to claim 1, wherein, when another particle forms said at least one layer built in the construction step, this other particle is coloured, pigmented, colourless, transparent or translucent.

8. The method according to claim 1, wherein said at least one functional particle is comprised in a functional ink selected from the group consisting of an electroluminescent ink, a phosphorescent ink, photoluminescent ink, a conductive ink, a semi-conductive ink, an electroactive ink, a magnetic ink, a photochromic ink, electrochromic ink, thermochromic ink, an ionochromic ink and a mechanochromic ink.

9. A timepiece component comprising at least one functional element that can be obtained from the method according to claim 1.

10. The timepiece component according to claim 9, wherein the functional element is a constituent part of the timepiece component.

11. A timepiece having at least one timepiece component according to claim 9.

12. A system for producing a functional element on a timepiece component, which system implements the method according to claim 1, the system comprising a printing device and a control unit, said printing device being connected to said control unit.

13. The system according to claim 12, wherein the control unit comprises hardware and software resources, said hardware resources comprising memory elements having at least one reference digital graphical representation relating to said functional element to be produced on the timepiece component and descriptive data relating to said at least one reference digital graphical representation.

14. A computer program comprising program code instructions for carrying out the steps of the method according to claim 1 when said program is run by a control unit.

15. The method according to claim 6, wherein the light radiation is ultraviolet or infrared radiation.

16. The method according to claim 1, wherein said at least one functional particle is comprised in a phosphorescent ink.

17. The method according to claim 1, wherein said physical or chemical functional characters possessed by the functional element include conductivity.

18. The method according to claim 1, wherein said physical or chemical functional characters possessed by the functional element include magnetism.

19. The method according to claim 1, wherein said visual, aesthetic, or structural aspects of the reference digital graphical representation include color and texture.

20. The method according to claim 1, wherein at least one dimension of the reference digital graphical representation includes a thickness of the reference digital graphical representation.

* * * * *